United States Patent Office.

DENNIS C. GATELY, OF NEWTOWN, CONNECTICUT, ASSIGNOR TO NEW YORK BELTING AND PACKING COMPANY.

Letters Patent No. 83,374, dated October 27, 1868; antedated October 2, 1868.

IMPROVED VULCANIZED INDIA-RUBBER BELTING.

The Schedule referred to in these Letters Patent and making part of the same.

*To whom it may concern:*

Be it known that I, DENNIS C. GATELY, of Newtown, in the county of Fairfield, and State of Connecticut, have invented certain new and useful Improvements in Vulcanized India-Rubber Belting; and I hereby declare the following to be a full, clear, and exact description of the same.

The nature of my invention consists in forming machine-belting of thick paper or pasteboard, coated with vulcanized India rubber or other gums.

The paper or pasteboard I prefer to use is made of long fibre, and of continuous length, and is manufactured for this purpose in sheets of any desired width.

The coating of India rubber is applied on either or both sides of the paper by ordinary calender-rolls, in accordance with any of the modes well known to manufacturers of vulcanized-rubber belting.

The paper to which the India rubber is applied may be cut into strips of the width desired for the finished belting, either before or after being coated and vulcanized. It is preferable, however, to cut a strip of the requisite width previous to its being coated, for the reason that in such case the edges of the rubber sheets or coating can be readily turned over by hand or otherwise, so as to cover the edges of the paper or pasteboard strip, and thus protect them against dampness.

The paper sheet, coated with rubber, as above indicated, may be vulcanized between metal plates or sheets of tin-foil, or in any other ways indicated in Letters Patent of the United States heretofore granted me for producing vulcanized rubber belting having surfaces, as nearly as practically possible, perfectly smooth, or it may be vulcanized in any other ordinary or suitable manner.

Instead of forming the belting of one sheet of paper, coated with India rubber or other gum, it may be composed of several layers of paper, of suitable thickness, with rubber interposed, or, in other words, of alternate layers of paper and India rubber, the outer layers or surfaces of the belting being of rubber, as above described. Belting made in this manner would possess more elasticity, and would, perhaps, be better secured against the danger of splitting, to which it might at times be liable if its paper body were formed of one thick sheet.

In conclusion, I would observe that I do not wish to confine myself to any particular kind of paper. I propose to use such paper as is best suited for the purposes of belts, *i. e.*, having great strength to resist tensile strain, and not very liable to wear or split.

The paper-stock composed partly of scraps of leather or hide, would produce a paper peculiarly fitted for the purpose contemplated.

Having now described my invention, and the manner in which the same is or may be carried into effect,

What I claim, and desire to secure by Letters Patent, is—

1. Belting or banding for driving machinery, composed of paper or other pulped and calendered material, combined with India rubber or other vulcanizable material, substantially as herein set forth.

2. The use, in combination with paper or other pulped and calendered material, of a vulcanizable cement, applied either externally as a coating, or both internally, as a cement between several layers of paper, and externally, substantially as and for the purposes set forth.

3. The vulcanizing of paper belting, with rubber or other material or compound capable of vulcanization, between metal plates or otherwise, as herein indicated, so as to produce a smooth surface on the belts, substantially as set forth.

In testimony whereof, I have signed my name to this specification before two subscribing witnesses.

DENNIS C. GATELY.

Witnesses:
JAMES M. BLACKMAN,
W. W. PERKINS.